United States Patent [19]

Gustafson

[11] 4,140,387

[45] Feb. 20, 1979

[54] APPARATUS FOR PRODUCING COLLATED COPIES FROM TWO SIDED ORIGINALS

[75] Inventor: Gary B. Gustafson, Hilton, N.Y.

[73] Assignee: Eastman Kodak Company, Rochester, N.Y.

[21] Appl. No.: 867,842

[22] Filed: Jan. 9, 1978

Related U.S. Application Data

[63] Continuation of Ser. No. 691,938, Jun. 1, 1976, abandoned.

[51] Int. Cl.² .......... G03B 27/32; G03G 15/00; B65H 5/00; B65H 29/00

[52] U.S. Cl. .......... 355/14; 355/23; 271/3.1; 271/65

[58] Field of Search .......... 355/23-26, 355/75, 47-51, 14; 271/3, 3.1, 4, 9, 65, 186

[56] References Cited

U.S. PATENT DOCUMENTS

| | | | |
|---|---|---|---|
| Re. 27976 | 4/1974 | Sahley | 355/64 |
| 1,939,446 | 12/1933 | Hessert | 355/23 |
| 2,472,931 | 6/1949 | Yohn | 355/23 |
| 3,227,444 | 1/1966 | Egan | 271/65 |
| 3,318,212 | 5/1967 | Rubin | 355/3 R |
| 3,416,791 | 11/1968 | Beckman, Jr. et al. | 271/65 |
| 3,536,398 | 10/1970 | Bhagat | 355/3 |
| 3,552,739 | 1/1971 | Roberts et al. | 271/4 |
| 3,556,511 | 1/1971 | Howard et al. | 271/4 |
| 3,615,129 | 10/1971 | Drawe et al. | 355/3 |
| 3,623,806 | 11/1971 | Short | 355/14 |
| 3,630,607 | 12/1971 | Korn et al. | 355/6 |
| 3,645,615 | 2/1972 | Spear, Jr. | 355/3 |
| 3,671,118 | 6/1972 | Fantuzzo et al. | 355/3 R |
| 3,672,765 | 6/1972 | Altmann | 355/24 |
| 3,675,999 | 7/1972 | Komori et al. | 355/8 |
| 3,687,541 | 8/1972 | Aser et al. | 355/14 |
| 3,700,231 | 10/1972 | Aasen et al. | 271/65 X |
| 3,709,595 | 1/1973 | Turner et al. | 355/14 |
| 3,775,102 | 11/1973 | Punnett | 96/1 R |
| 3,841,754 | 10/1974 | Drexler et al. | 355/17 |
| 3,844,653 | 10/1974 | Kelly | 355/8 |
| 3,851,872 | 12/1974 | Gerbasi | 271/173 |
| 3,856,295 | 12/1974 | Looney | 271/65 |
| 3,862,802 | 1/1975 | Till | 355/23 |
| 3,866,904 | 2/1975 | Stemmle | 271/173 |
| 3,869,202 | 3/1975 | Tabata et al. | 355/3 R |
| 3,888,579 | 6/1975 | Rodek et al. | 271/4 X |
| 3,980,406 | 9/1976 | Lang | 355/24 |

OTHER PUBLICATIONS

"Research Disclosure Bulletin", vol. 133, No. 13329, May 1975.

"Disclosure No. 14237", No. 142, Feb. 1976, pp. 38–40, Industrial Opportunities Ltd.

*Primary Examiner*—Stephen J. Tomsky
*Assistant Examiner*—W. J. Brady
*Attorney, Agent, or Firm*—G. H. Childress

[57] ABSTRACT

A convenience copier is provided with the capability for producing duplex, collated copies in page-sequential order, or an approximation thereof. The copier includes a processing section for establishing visible representations of the original, feeding sections for presenting the original sheets and copy sheets to the processing section on a one-original-sheet one-copy-sheet basis, and inverting means for presenting both faces of the original sheets to the processing section for copying and both faces of the copy sheets to the processing section for receiving the visible representations. The original sheets are circulated to the processing section in a manner suitable for producing collated copies and inverted with each circulation in a manner suitable for producing the copies in page sequential order.

22 Claims, 7 Drawing Figures

APPARATUS FOR PRODUCING COLLATED COPIES FROM TWO SIDED ORIGINALS

CROSS-REFERENCE TO RELATED APPLICATIONS

This application is a continuation of application Ser. No. 691,938, filed June 1, 1976, now abandoned.

Reference is made to U.S. patent application Ser. No. 523,610, now abandoned, entitled RECIRCULATING SHEET FEEDER, filed in the name of M. J. Russel on Nov. 13, 1974 and refiled as U.S. patent application Ser. No. 647,683 on Jan. 8, 1976; and to U.S. patent application Ser. No. 691,937, now U.S. Pat. No. 4,099,150, entitled APPARATUS FOR PRODUCING DUPLEX COLLATED COPIES, filed on even date herewith in the name of John L. Connin.

BACKGROUND OF THE INVENTION

1. Field of the Invention

The present invention relates to convenience copiers and reproduction apparatus. More specifically, the invention relates to such copiers and apparatus having collating and duplex capabilities.

2. Description of the Prior Art

It is well known in the prior art to provide convenience copiers: 1) with duplex capabilities; 2) with document feeders that circulate the document in a manner suitable for producing collated copies; or 3) with document inverters that present both sides of the document for copying. Examples include: 1) in relation to the first feature — U.S. Pat. Nos. 3,318,212; 3,536,398; 3,615,129; 3,630,607; 3,645,615; 3,671,118; 3,672,765; 3,687,541; 3,697,171; 3,775,102; 3,844,653; 3,856,295; 3,862,802; 3,866,904; 3,869,202; 2) in relation to the second feature — U.S. Pat. Nos. RE 27,976; 3,552,739; 3,556,511; 3,709,595; 3) and, in relation to the third feature — U.S. Pat. Nos. 3,227,444; 3,416,791 and 3,675,999.

It also is known in the prior art to combine certain of the above-mentioned features in a unified structure or control. U.S. Pat. No. 3,630,607 might be considered especially relevant in its disclosure of a collating feeder on a convenience copier having duplex capabilities. Other combinations of such features are disclosed in U.S. Pat. No. 3,844,653 (a convenience copier having duplex capabilities plus a document inverting mechanism); U.S. Pat. No. 3,862,802 (a duplex copier having a document inverting mechanism useable with a sorter to produce collated copies); and "Research Disclosure Bulletin" Vol. 133, No. 13329, May 1975 (a manual approach for producing collated duplex copies without a sorter).

It is clear from the above-noted disclosures that numerous rather sophisticated structures have been developed for modern copiers to supplement their basic copying function. It is believed that such structures operate satisfactorily for their intended purposes, and many of the resulting features greatly improve the convenience and economics of the total copying operation. It will be apparent from the present invention, however that convenience copiers and duplicating apparatus can be provided with further significant and valuable features and improvements that are not avilable from, or otherwise taught by, the prior art. Typical prior art structures which are capable of producing duplex copies, for example, cannot handle two sided originals on a fully automatic basis, or have required a cumbersome and expensive sorter that complicates on-line stapling and off-set stacking. Also missing in the prior art is the facility for producing duplex collated copies in page-sequential order, or an approximation thereof, that permits finishing operations on one copy without delay waiting for other copies.

SUMMARY OF THE INVENTION

In accordance with the present invention, a convenience copier or duplicating apparatus is provided with the capability for automatically producing duplex collated copies in page-sequential order, or an approximation thereof, on a fully automatic basis and without a sorter. An especially desireable characteristic is that one copy can be completed on both faces, ready for on-line finishing, without delay waiting for the other copies to be processed on either face.

According to one aspect of the invention, a convenience copier includes an image-processing section for establishing visible representations of the original, and feeding sections for presenting original and copy sheets to the processing section on a one-original sheet one-copy-sheet basis. The feeding sections invert the original and copy sheets to present both faces of the original sheets for copying and both faces of the copy sheets for receiving the visible representations. At the same time, the feeding sections circulate and recirculate the original sheets seriatim; removing one-sheet-at-a-time from a supply, presenting both faces of the removed sheet to the processing section for copying one-face-at-a-time, and returning the copied sheet to the supply after one exposure of each respective face. The copy sheets are presented to the processing section in a sequence appropriately synchronized with the original sheets for receiving the visible representations and for producing the final copies approximately in page sequential order.

Other aspects and more specific features will become apparent to those skilled in the art from the following description, with reference to the accompanying drawings.

BRIEF DESCRIPTION OF THE DRAWINGS

In the detailed description of the preferred embodiment of the invention presented below, reference is made to the accompanying drawings, in which.

DESCRIPTION OF THE PREFERRED EMBODIMENT

Figure 1:
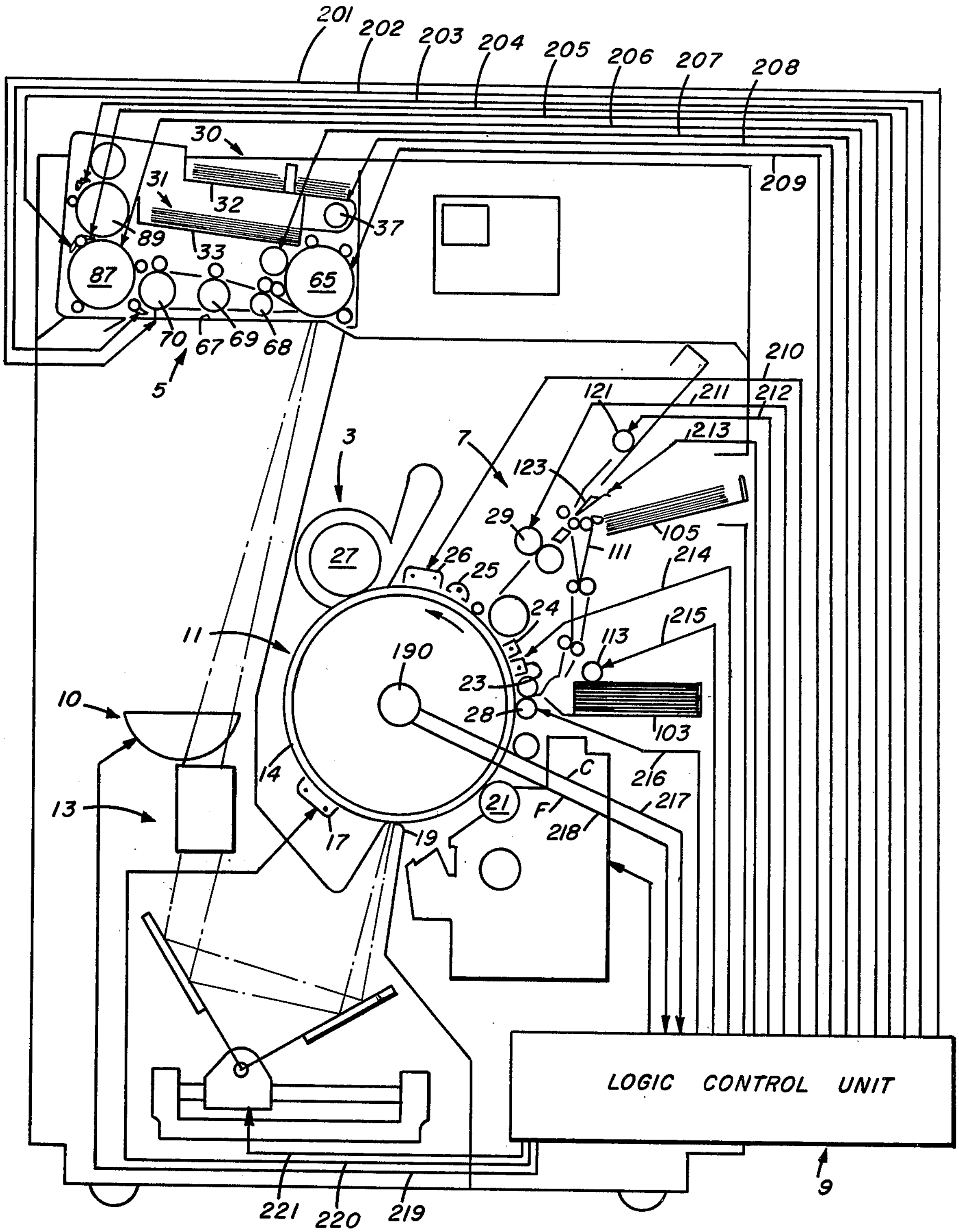
FIG. 1 is a schematic representation of a convenience copier having duplex capabilities and including a collating inverting document feeder in accordance with the present invention.

Referring now to the drawings, and especially to FIG. 1, a convenience copier is depicted in accordance with a preferred embodiment of the present invention, comprising a process section 3, and feeding sections 5 and 7, including logic and control unit 9. The process section 3 is defined by an imaging device or projector 10 and a processor 11 for establishing visible representations of originals, typically as image-wise distributions of marking particles. The feeding sections 5 and 7 present the original and copy sheets to the process section on a one-original sheet one-copy-sheet basis. They also invert the original and copy sheets to present both faces of the original sheets for copying and both faces of the copy sheets for receiving the visible representations.

The term original, as used in the present application, refers to the object to be copied, including documents and masters in cut or sheet form and comprising a set of one or more sheets or pages. A "receiver", "sheet", "support", "support material", or "supporting medium" of the original is used in reference to a single expanse of relatively thin, essentially flat material, such as paper, microfilm or a transparency, having two opposite faces or sides. A "page" of an original is a face or side of one sheet having an image, marking or information to be copied. A single sheet of an original may include one or two pages, depending on whether one or both faces include information to be copied. A "simplex" original includes one page per sheet; a "duplex" original, two. Reference to facing sides or pages by number or as "odd" or "even", refers to a sequential numbering in order from what conventionally is considered the beginning of the original to its end, and does not depend on how the pages are actually numbered. Two sheets of a simplex original would have pages 1 (odd) and 2 (even) on separate sheets. In a duplex original pages 1 (odd) and 2 (even) would be on opposite sides of the same sheet.

The term "copy" refers to a duplicate of the complete set of original sheets, in the usual sense, including receivers or supporting mediums, and having sheets, faces or sides, and pages as the terms are defined above. A "collated" copy is one that has its pages in the normal order of the original, such as for reading, but not necessarily the same page arrangement; i.e., a simplex original can be duplex in its copy, and still be collated.

Referring again to FIG. 1, the process section can be selected from suitable designs known to those skilled in the art, and a brief reference to its general configuration is considered sufficient for the purposes of the present application. A scan/drum arrangement is depicted in which the imaging device 10 includes scanning optical and illumination mechanisms 13, while the processor includes a photoconductor 14 supported on a drum for movement in a cylindrical or closed path. As the photoconductor moves in the cylindrical path, it is acted upon by various processing stations. Proceeding counterclockwise, in the direction of drum rotation, the photoconductor is sensitized by a corona charger at station 17, is exposed by the image device at station 19, is developed by a magnetic brush at station 21, moves through corona transfer and detack stations 23 and 24, is erased by illuminators and corona chargers at station 25 and 26 and is cleaned by a vacuum brush at station 27. Two additional processing stations 28 and 29 are spaced from the photoconductor in a copy support path. These stations include a registration device and fuser, respectively. In operation, the imaging device 10 sequentially scans the images from successive original sheets onto successive frames of the photoconductor, where visible representations of the original sheets are established for successive transfer to the copy supports.

A further description of the above-mentioned stations, and the imaging device is presented in commonly assigned copending U.S. Patent application Ser. No. 629,190, entitled OPTICAL SCANNING APPARATUS FOR COPYING MACHINES, filed in the names of A. Zanolli and C. Hage on Nov. 5, 1975, now abandoned, the disclosure of which hereby is incorporated by reference into the present application.

Another arrangement that could be modified in accordance with the present teachings, is disclosed in U.S. Pat. Nos. 3,914,047, entitled SYNCHRONIZING CONTROL APPARATUS FOR ELECTROPHOTOGRAPHIC APPARATUS UTILIZING DIGITAL COMPUTER, issued on Oct. 21, 1975 in the name of William E. Hunt, et al; and 3,876,106 entitled TONER CONCENTRATION MONITORING APPARATUS UTILIZING PROGRAMMABLE DIGITAL COMPUTER, issued on Apr. 8, 1975 in the name of Stephen R. Powell, et al. This last mentioned arrangement is exemplary of the flash/web type.

The feeding section 5, for the originals, includes a document preparation portion 30 and a document circulating portion 31.

Figure 4:
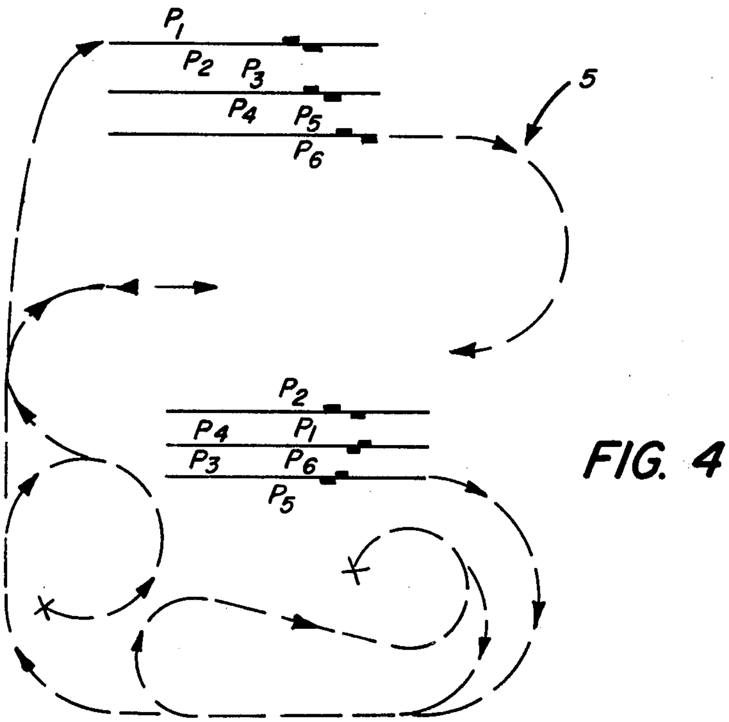
FIG. 4 is a schematic view depicting the path of movement of an original sheet during operation of the feeder illustrated in FIG. 3.
Figure 3:
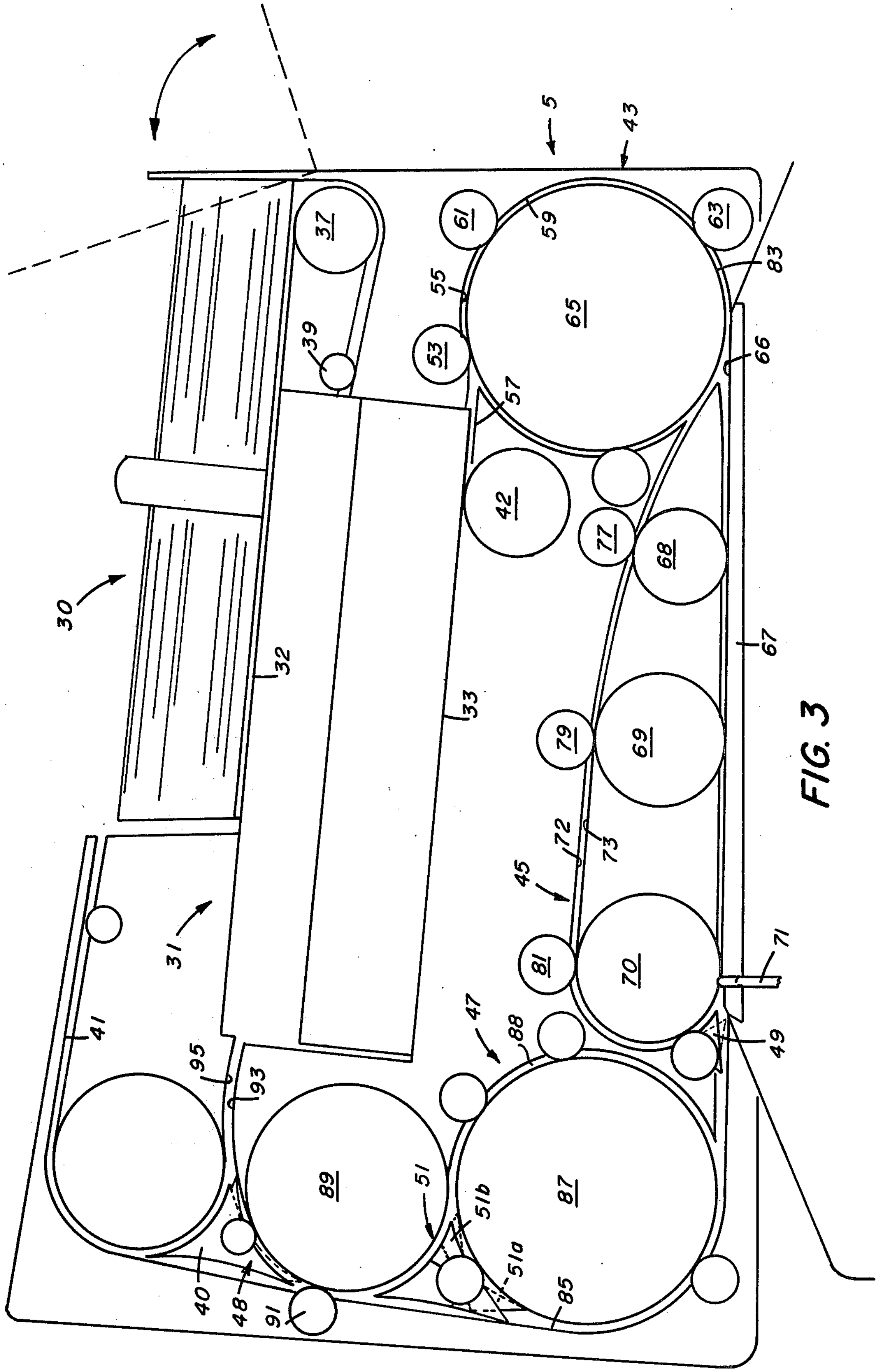
FIG. 3 is a more detailed illustration representing a collating inverting feeder according to the invention.

The preparation portion receives the set of original sheets in their normal order and prepares the set for copying by inverting the sheets one-after-another while transferring the sheets to the circulating portion and from a first hopper 32 to a second hopper 33. This procedure alters the page-sequential order of the document so that a six-page duplex original, for example, which begins in the page order 1, 2, 3, 4, 5, and 6 from top to bottom, will be transformed to a page order 2, 1, 4, 3, 6 and 5, from top to bottom. In this last mentioned order the document is ready for presentation to the process section in a manner that will generate duplex collated copies approximately in page sequential order. Referring more specifically to FIGS. 3 and 4, the original is inverted and transferred from the preparation portion to the circulating portion, to prepare the original for copying, by an oscillating vacuum pick-off roller 37 and a rotary propulsion wheel 39. The roller and wheel, in combination with appropriate guides, remove the sheets one-after-another from the bottom of the stack in hopper 32, turn the sheets over, and restack the sheets in hopper 33 with each respective sheet on top of previously stacked sheets. After copying, the original sheets are returned to their normal order by inverting the sheets again, one-after-another, while returning the sheets to the first hopper 32. This is accomplished, in a manner that will become more apparent from the following description, by sheet diverters 51 and 40, and by guideway 41, which redirect circulating sheets back to the first hopper 32, each sheet on top of previously delivered sheets, and in their normal page sequential order, i.e., page 1, 2, 3, 4, 5 and 6, from top to bottom.

The circulating portion 31 of the feeder is configured to circulate and recirculate the original sheets seriatim, removing one-sheet-at-a-time from the hopper 33, or other suitable storage facility, presenting both faces of the removed sheet to the process section for copying one-face-at-a-time, and returning the copied sheet to the hopper 33 after one exposure of each of its respective faces. The entire set of original sheets is circulated once to make the first copy and is recirculated once again for each additional copy.

Suitable structure for this circulating portion is depicted in FIG. 3, including a sheet pick-off device 42; first, second, third and fourth sheet inverters 43, 45, 47 and 48 respectively; first and second sheet diverters 49 and 51, respectively; and various sheet propelling rollers and related guiding structure, such as depicted at 53 and 55, respectively. Diverter 51 has two fingers **51*a* and 51*b***.

The pick-off device 42 is an oscillatory vacuum roller located at the bottom of the supply hopper, adjacent one end, from which it removes the original sheets one-at-a-time through exit slot 57 and directs the removed sheets into an arcuate guideway 59. The guideway 59 comprises the first sheet inverter, and is defined between guide 55 and rollers 53, 61 and 63, on the one hand, and a rotary propulsion device 65, on the other hand, which grasps the sheet and propels it from the hopper exit 57 to an entrance 66 adjacent the exposure position. The guide assists in conforming the sheets to an arcuate path of approximately 180 degrees for effectively inverting the sheets.

From the first inverter, the original sheets are directed onto the exposure platen 67 where they are urged by three propulsion rollers 68, 69, and 70 into alignment with a registration gate 71. In this position, the sheets are aligned for projection of an image from the first or even face of the original (i.e., page 6) onto the photoconductor.

After one exposure, the registration gate 71 is removed and the first diverter 49, in the diverting position, depicted in dotted line in FIG. 3, directs the sheets into the second sheet inverter 45. This second inverter includes guiding structure 72 and 73 defining opposite sides of a guideway, the previously mentioned propelling rollers 68, 69, and 70, corresponding back-up rollers 77, 79 and 81, and a portion 83 of the first inverter 43. It should be apparent that a sheet following the guideway in a clockwise direction will move back over and above the platen, to the first inverter where, by oscillating propelling roller 65 first in a counterclockwise direction and then in a clockwise direction, the sheet will be redirected back onto the platen for re-registration at gate 71. This time, however, it is the second or odd face (i.e., page 5) that is engaging the platen for copying.

After the last-mentioned side is copied once the gate is removed again, but this time the diverter 49 has been moved to a non-diverting position, depicted in solid line in FIG. 3, for directing the sheet to the third inverter 47. Here another guide 85 and the fingers **51*a* and 51*b* of the second diverter 51, now located in their respective solid line positions, cooperate with propelling roller 87 to conform and drive the sheets into an arcuate inverting path 88. In this case the propelling roller 87 oscillates first clockwise, until the sheet clears the diverter 51, and then with diverter finger 51*b* in its dotted line position, roller 87 is driven counterclockwise to direct the sheets through inverter 48 and back to the supply hopper 33. The final inverter includes the propelling roller 89, back-up roller 91, and guides 93 and 95 all of which define a guideway leading to an entrance of the supply hopper 33** adjacent the top and opposite end thereof from which the sheets were first removed.

Reviewing the operation of both portions of the feeder, the original, comprising a set of individual sheets, is placed face-up in a receiving hopper 32, from which it is prepared for copying by an inverting device including the oscillating roller 37 and rotary propulsion wheel 39. The sheets are removed one at a time from the bottom of the stack, inverted or turned over, and re-stacked in the storage facility or hopper 33. In addition to turning the sheets over, this initial process changes the page-sequential order of the original so that subsequent operations will produce properly collated copies.

The original sheets then are circulated, one after another, from the bottom exit at one end of the supply hopper or storing facility to an exposure position spaced therefrom, and then back to a top entrance at the other end of the hopper. Each sheet is presented to the process section twice for each circulation, once and only once on each face, and is returned to the supply hopper or storage facility in the same page-wise sequence as it was removed. Thus the set of original sheets are circulated away from and back to the storage facility only once for each respective copy.

Circulation of the original sheets in the manner described above, with the copier depicted in FIG. 1, will produce collated copies in page sequential order. A second mode of operation, which also is contemplated by the invention, however, approximates page sequential copying, but offers improved efficiency while retaining most of the advantages of page sequential copying. In this second mode, and continuing with the example of a 6 page duplex original, efficiency can be improved by copying in the order: page 6, page 4, page 5, page 3, page 2 and page 1, since in this order the sheet supporting page 4, for example, can be positioned for copying while the sheet supporting pages 6 and 5 is inverted.

In either mode of operation, each respective original sheet is inverted between each of its respective presentations for copying, so that both of the first and second faces will be presented for copying every time the sheet is circulated.

Figure 5:
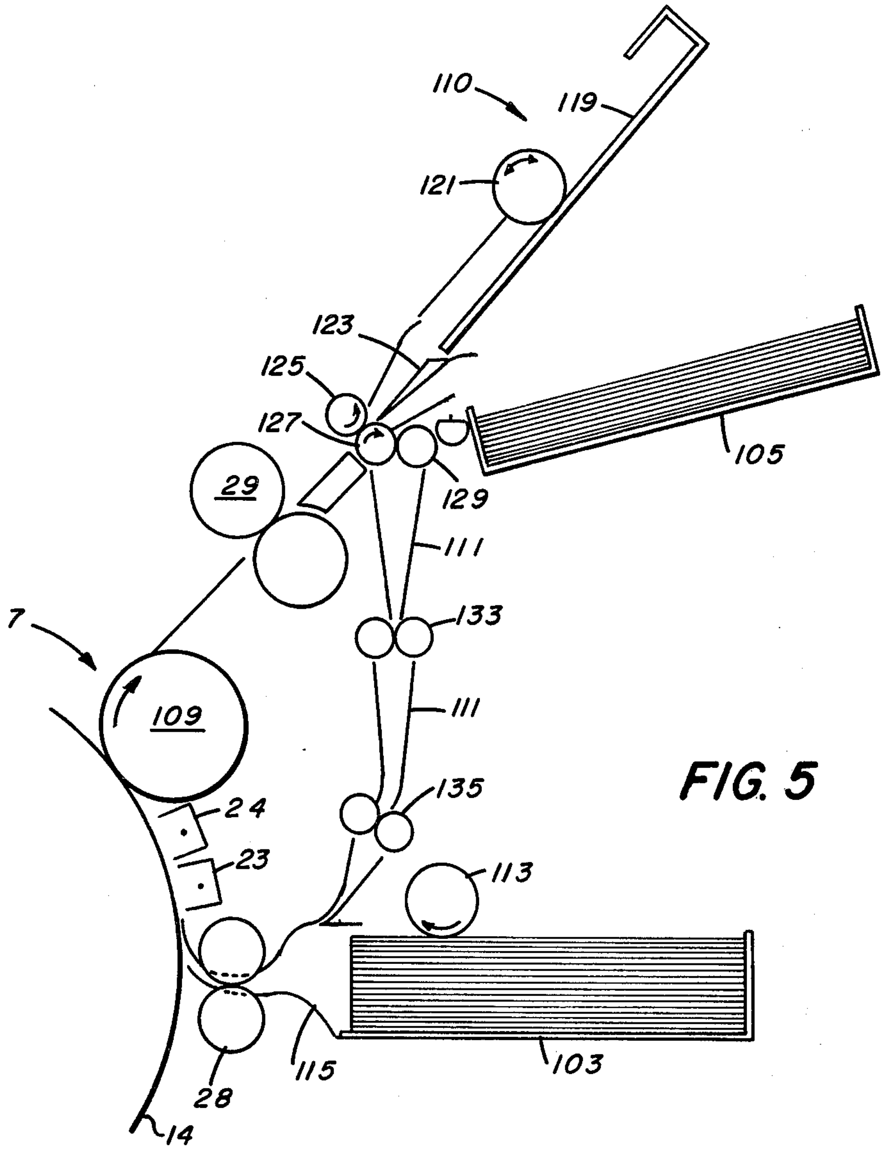
FIGS. 5–7 are schematic views representing a copy-sheet feeding section of the convenience copier of FIG. 1, illustrating the path of movement of a copy sheet during the operation of the copier.
Figure 6:
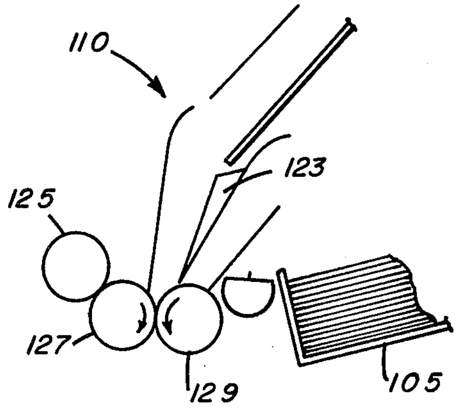
Figure 7:
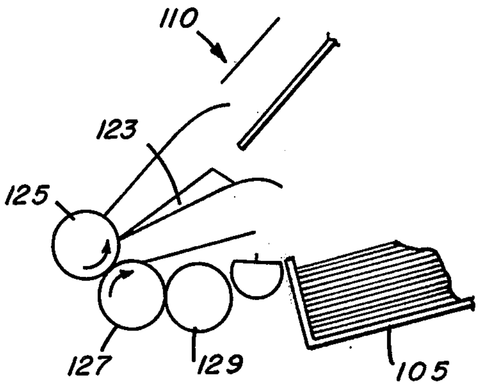

Referring now to FIGS. 5 through 7, and to the copy-sheet feeding section, suitable mechanisms are provided for presenting the copy sheets to the process section in a sequence appropriately synchronized with the original sheets for receiving the visible representations on both faces of the copy sheets, and for producing the copies in the same page-sequential order, or approximation thereof, that the originals are presented to the process section.

The copy feeding section 7 presents and re-presents the copy sheets to the process section seriatim, removing one-sheet-at-a-time from a first hopper or supply 103, presenting both faces of the removed sheet to the process section for receiving the visible representations one-face-at-a-time, and delivering the final copy to a second or exit hopper 105 after receiving one visible representation on each respective face.

In operation, the copy sheets are placed as a stack in hopper 103. From the hopper the sheets are fed one-at-a-time through the registration station 28 and into engagement with the photoconductor 14 for receiving an image-wise distribution of marking particles visibly representing an original image on a first face of the copy sheet. The copy sheet with its marking particles is then separated from the photoconductor at station 24, and is directed by a turn-around device and sheet inverter 109 to the fixing or fusing device 29, which device permanently fuses the particles into the fiber of the copy sheet. In the case of simplex copies, the sheet is ready after fusing for delivery to the exit hopper 105, where all of the sheets are collected face-up in order with each sheet on top of previously delivered sheets.

When duplex copies are desired, further processing is required after the first fusing of an image on one face of the copy sheet, and for this purpose the sheet is reversed in its direction of movement by a turn-around device 110 and redirected toward the process section by a return path such as that depicted at 111 in FIG. 5. A sheet returned along path 111 will then be guided once again through the registration device and back along the first-followed path described above. This time, however, it is the second face of the sheet that engages the photoconductor and that receives the marking particles. Also, on the second pass, when the duplex sheet is separated from the photoconductor, it is directed to follow the same path as described above for a simplex sheet, through the sheet inverter 109, the fusing device 29 and into the exit hopper 105. As this sequence is repeated each copy sheet will receive images on its first and second faces, one-copy-sheet-after-another, until the entire original is copied the desired number of times.

Referring again to the example of a six page duplex original and reviewing the above-described operation, the copy sheets are presented one-after-another to receive the visible representations in the page-sequential order: page 6, page 5, page 4, page 3, page 2, page 1, and the sheets are delivered to the exit hopper with the sheet supporting pages 6 and 5 first (page 5 facing up); the sheet supporting pages 4 and 3 next (page 3 facing up); and the sheet supporting pages 2 and 1 last (page 1 facing up). After the first copy is so produced and delivered, a second copy is generated in a similar manner, and so forth until the desired number of copies has been completed.

Suitable structure for the copy-feeding section is depicted in FIGS. 5–7. A sheet feeder, including the hopper 103 and an oscillating vacuum pick-off roller 113, removes the copy sheets one-at-a-time from the stack in the hopper and sequentially delivers the removed sheets to guideway 115, leading through the registration device and to the photoconductor.

The turn-around and sheet inverting roller 109 rotates in a clockwise direction as viewed in FIG. 5. The roller shell acts as a vacuum plenum, for conforming the sheets to an arcuate inverting path of movement as depicted.

The turn-around device 110 includes an intermediate hopper or slot 119 for receiving one copy sheet at a time, a reversible roller 121 for engaging and reversing the direction of a copy sheet received in slot 119, a sheet diverter 123, and three redirecting rollers 125, 127 and 129. In the case of simplex copies, the diverter 123 is positioned as depicted in FIG. 7 for directing sheets emerging from between rollers 125 and 127 into the exit hopper. In the case of duplex copies, the diverter is positioned for the first pass first as depicted in FIG. 5, directing the sheets from between rollers 125 and 127 into slot 119, and then as depicted in FIG. 6 for redirecting sheets from slot 119 into rollers 127 and 129 leading to guideway 111. Suitable driving roller pairs 133 and 135 assist in moving the sheets in the guideway. On the second pass, the diverter is positioned as depicted in FIG. 7 for delivering the sheets to the exit hopper in the same manner as for simplex sheets.

In the second mode of operation suitable modifications would be made so that the sequence of the copy-sheet presentations will correspond to the sequence of the original sheet presentations. In the example, this would be page 6, page 4, page 5, page 3, page 2, and page 1. Such an order uses the copy paper path more efficiently as should now be apparent to those skilled in the art.

Figure 2:
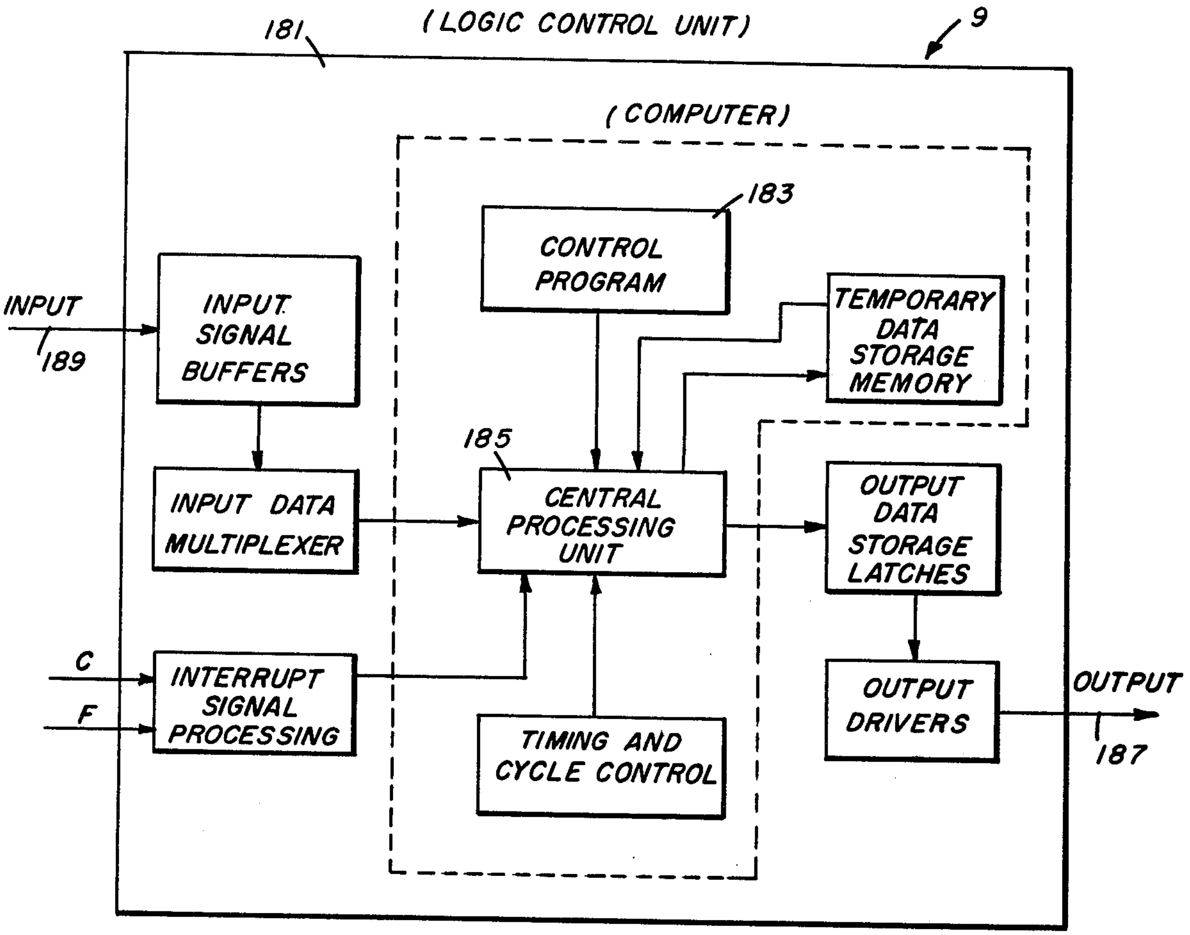
FIG. 2 is a schematic view depicting generally the logic and control unit of the copier represented in FIG. 1.

A logic and control unit for accomplishing the above modes of operation is depicted in FIGS. 1 and 2. Its function generally is to coordinate the activities of the process section and the feeding sections. The logic and control unit could be implemented by numerous suitable mechanisms such as relays, transistors, or small and medium scale digital integrated circuits. In this particular embodiment, a microcomputer 181 (FIG. 2) is utilized. In this form, the combination and sequential logic requirements of the process are embeded in a control program 183, which provides instructions to a central processing unit 185 to control the states of output signals 187 based upon the status of input signals 189 and timing signals "C" and "F". The timing signals can be derived from a incremental encoder 190 connected to the drive means for the photoconductor drum, and provide information required to relate the position of the moving photoconductor to the positions of the fixed process stations.

The input and output signals are represented in FIG. 1 by reference characters 201–222. Taken in order, these characters identify control leads as follows:

201 leads to the registration gate 71, of the document feeder, controlling its two positions (raised and lowered or present and removed);

202 leads to the first sheet diverter 49, of the document feeder, for controlling its two positions (diverting and not diverting);

203 leads to a first finger 51*a* of the second sheet diverter 51, for controlling two positions of the finger (one for inverting sheets and one for returning sheets to hopper 32);

204 leads to the return diverter 40, of the document feeder for controlling its two positions (one for returning sheets to hopper 33 and one for returning sheets to hopper 32).

205 leads to a second finger 51*b*, of the second sheet diverter 51, for controlling two positions of the finger (one for permitting movement of the sheets into the third inverter 47 and one for returning the sheets to hopper 33);

206 leads to propelling roller 87 for oscillating the roller clockwise and counterclockwise;

207 leads to vacuum pick-off roller 42 for energizing the vacuum and oscillation of the roller to remove sheets one-after-another from hopper 33;

208 leads to vacuum pick-off roller 37 for energizing its vacuum source and oscillation to remove sheets one-after-another from hopper 32;

209 leads to propelling roller 65, which may be connected to rollers 68, 69 and 70, for oscillating the propelling roller;

210 leads to the erase and cleaning stations 25, 26 and 27 for turning such stations on or off;

211 leads to the fuser 29 for controlling its operation;

212 leads to turn-around roller 121 for controlling oscillation of the roller;

213 leads to the sheet diverter for controlling its three positions depicted, respectfully, in FIGS. 5, 6 and 7;

214 leads to the transfer and detacking coronas for on and off control;

215 leads to sheet feeding roller 113 for controlling the initiation of sheet feeding from hopper 103;

216 leads to the registration device 28 for controlling the proper registration of sheets on the photoconductor;

217,218 leads to the shaft encoder for acquiring the C and F timing signals therefrom;

219 leads to the illumination source for turning it on or off and for controlling its scanning;

220 leads to the primary charger 17 for on and off operation; and 221 leads to the image projector 13 for controlling scanning an image of an original on platen 67 onto the photoconductor.

Further description of suitable control devices are presented in previously referenced U.S. Pat. No. 3,914,047, and in commonly assigned copending U.S. Patent application Ser. No. 671,865, entitled ORIGINAL DOCUMENT REARRANGEMENT APPARATUS FOR USE IN RECIRCULATING FEEDERS, filed on Mar. 30, 1976 in the name of M. G. Reid, et al., now Defensive Publication No. T957,006, published Apr. 5, 1977. Both of these last-mentioned cases hereby are incorporated by reference into the present application.

Under the influence of the logic and control unit, the presentation to the process section of the original and process sheets, and their inversion, is coordinated so that the copies will be collated in page-sequential order, or an approximation thereof. For each circulation of an original sheet, an exposure is made to establish a visible representation of one face of that sheet, and for each visible representation that is established, a copy support is presented to receive it. Thus, the original and copy sheets are fed on a one-for-one basis. This is not to say that there are an equal number of original and copy sheets, which would not be the case, of course, when multiple copies are generated, but rather that there is one-for-one correspondence in the presentations of the respective sheets to the process section. Nor is it intended that the original and corresponding copy sheets must be fed at the same time. Generally the feeding of an original sheet is displaced in time from the feeding of its corresponding copy sheet, either forward or backward depending upon the machine configuration.

The logic and control unit also tracks the copies as they are made, so that it can direct the document feeder to invert the original, and switch copy hoppers, at the appropriate times. In practice this can be accomplished by relatively simple procedures for counting and then shifting the appropriate diverters and solenoids in the appropriate sequence so that the first and second faces of the copies will properly correspond with the first and second faces of the original.

Offset stacking, stapling and other finishing operations have not been depicted. It is intended, however, that such apparatus be controlled for operation in synchronism with the copier, preferably by the logic and control unit 9.

From the foregoing it should be apparent that the structure of the present invention provides significant advantages not heretofore available from the teaching of the prior art. Duplex copies can be generated from simplex or duplex originals, fully automatically, and the copies will be collated and delivered approximately in page-sequential order without a sorter. The structure is relatively simple, requires minimum alterations for implementation with presently available office copiers of the duplex type, and can be made reliable in operation. The originals are loaded in a natural manner, i.e. face-up, and the copies are delivered in the same manner. Moreover, the copier is especially conducive to simple finishing operations, such as stapling or off-set stacking. Generally speaking, the convenience of the copier is extended by the present invention to the copy finishing operations, because the copies can be stapled and stacked as delivered from the copier without an intervening sorter.

It should be understood that the present invention and claims contemplate modes of operation that will account for the usual variations in originals. A duplex original that ends on the first face of the last sheet, for example, need not be copied on the blank face. In a similar respect, it should be recognized that all of the capabilities that are available in accordance with the present invention need not be used in every mode. Thus, the document feeder can have a non-collating mode and a simplex mode in addition to its collating duplex mode of operation.

Although the invention has been described in detail with particular reference to preferred embodiments thereof, it will be readily understood that variations and modifications can be effected within the spirit and scope of the invention as described hereinabove and as defined in the appended claims.

I claim:

1. A copier for producing multiple copies of an original, the copies and the original including sheets of support material having first and second faces, said copier comprising:

a processing section including an exposure station and means for establishing image-wise distributions of marking particles representing the original;

means for presenting each sheet of the original to said exposure station of said processing section a plurality of times in succession, one presentation of an original sheet for each establishment of an image-wise distribution, said original presenting means including a storage facility for holding the original sheets and a sheet feeding mechanism defining a path for feeding the sheets from said storage facility to said exposure station and back to said storage facility, said sheet feeding mechanism including means for inverting each original sheet between its successive presentations to present both of the first and second original faces for copying; and means for presenting the copy sheets to said processing section, said copy-sheet presenting means including means for presenting and inverting the copy sheets in one-to-one correspondence with the presenting and inverting of the original sheets to present both of the first and second copy faces for receiving the image-wise distribution.

2. A convenience copier for producing collated copies of a document, the copies and the document including a plurality of sheets having first and second faces, said copier comprising:

a processing section including an exposure station and means for establishing visible representations of the document sheets;

means for presenting the document sheets to said exposure station of said processing section, said presenting means including a storage facility for holding the document sheets, means for circulating said document sheets successively a plurality of times from said storage facility to said exposure station and back to said storage facility, and means for inverting each document sheet to present both of its first and second faces for copying once for each circulation thereof; and means for presenting the copy sheets to said processing section, said copy-sheet presenting means including means for presenting and inverting the copy sheets in one-to-one correspondence with the presenting and inverting of the document sheets to present both of the first and second copy faces for receiving the visible representations.

3. A convenience copier for producing multiple copies of an original, the original and the copies including sheets having first and second faces, said copier comprising:

a processing section including an exposure station and means for establishing visible representations of the first and second faces of the original sheets, one representation after another;

means for circulating said original sheets successively a plurality of times to said exposure station of said processing section for presenting the first and second faces of the circulating sheets to said exposure station, said circulating means inverting each sheet an odd number of times between each of its presentations;

means for twice feeding the copy sheets to said processing section, once to receive a visible representation on the first face and once again to receive a visible representation on the second face; and means controlling said process section and said circulating means for presenting an original face to said exposure station once for each establishment of a visible representation, and controlling said processing section and said feeding means for presenting a copy face to said process section once for each establishment of a visible representation.

4. A convenience copier for producing multiple copies of an original, the original and the copies including sheets having first and second faces, said copier comprising:

a processing section including an exposure station and means for establishing visible representations of the first and second faces of the original sheets;

means for presenting the original sheets a plurality of times to said exposure station of said processing section, and for inverting each original sheet on odd number of times between each of its presentations, alternately to present the first and second faces of the original sheets to said exposure station for copying;

means for twice presenting the copy sheets to the processing section, and for inverting the copy sheet an odd number of times between presentations, alternately to present the first and second faces of the copy sheets to the processing section for receiving the visible representations of the first and second faces of the original sheets; and means for coordinating the presentation and inversion of the original sheets with the presentation and inversion of the copy sheets to produce duplex collated copies.

5. A copier for producing collated duplex copies of a duplex original, the original and the copies including individual sheets having first and second faces, said copier comprising:

a processing section including an exposure station and means for establishing visible representations of the first and second faces of the original sheets, one representation after another;

means for presenting the original sheets and copy sheets to said processing section a plurality of times, and for inverting each individual sheet, original and copy, between each of its presentations, to present the first and second faces of the original sheets to said exposure station for establishing visible representations thereof and to present the first and second faces of the copy sheets to said processing section for receiving such visible representations; and means controlling said presenting means and said processing section for presenting a different original face for each successive establishment of a visible representation.

6. A reproduction device for producing multiple copies of a document, the document and the corresponding copies thereof including a plurality of pages defined on first and second opposed faces of flat supports, said device comprising:

a processing section including means for establishing visible representations of the document pages, said processing section having an exposure platen at which the document support material is located for copying one page at a time, and a transfer station at which the visible representations of the document pages are applied to the copy support material to produce the copy pages;

a document feeder for presenting the document to said exposure platen of said processing section for copying, said document feeder including storage means for receiving and supporting the document spaced from said exposure platen, and means for circulating and recirculating the document from said storage means to said exposure platen and back to said storage means, said circulating and recirculating means including means for locating the document pages one-at-a-time on said exposure platen for copying every page once and only once during each circulation of the document; and a copy feeder for presenting the copy supports to said transfer station of said processing section to receive the visible representations, said copy feeder including means for twice presenting each copy support to said transfer station to receive the visible representations in synchronism with the presentation of the corresponding original pages to said exposure platen.

7. A convenience copier for producing multiple copies of an original, the original including sheets of support material bearing information on first and second faces thereof, the copies including sheets of support material having first and second faces for receiving information thereof, said copier comprising:

a process section including means for establishing distributions of marking particles representing information from the original sheets, said processing section having an exposure station from which the original sheets are copied one face after another, and a transfer station at which the copy sheets receive the distributions of marking particles from the process section;

an original sheet feeder for presenting the original sheets to said exposure station of said process section for copying, said original-sheet feeder including a hopper for receiving and supporting the original sheets in a stack spaced from said exposure station, and means for circulating and recirculating the original sheets, one-after-another, from said hopper to said exposure station and back to said hopper, said circulating and recirculating means including means for presenting seriatim the first and second faces of each original sheet to the exposure station for copying such faces once and only once during each circulation of that sheet; and a copy-sheet feeder for presenting the copy sheets to said transfer station of said processing section to receive the distributions of marking particles, said copy-sheet feeder including means for presenting seriatim the first and second faces of the copy sheets to said transfer station.

8. A convenience copier for producing a plurality of copies from a multi-page original, the original including a plurality of original supports defining odd and even original pages on opposite faces of the original supports, and each copy including a plurality of copy supports defining odd and even copy pages corresponding to the original pages, said copier comprising:

a processing section including means for establishing image-wise distributions of marking particles representing copied original pages, said processing section having an exposure position at which original pages are located for copying one-at-a-time and a transfer position at which copy pages are located for receiving the image-wise distributions one-at-a-time;

an original feeder for presenting the original supports to said exposure position of said processing section for copying, said original feeder including storage means for receiving and supporting the original supports spaced from said exposure position, and means for circulating and recirculating the original supports, one-after-another, from said storage means to said exposure position and back to said storage means, said circulating and recirculating means including means for presenting the odd and even original pages of each original support to the exposure position for copying once and only once during each circulation of that original support; and a copy feeder for presenting the copy supports to said transfer position of said processing section to receive the image-wise distribution of marking particles, said copy feeder including means for presenting the odd and even copy pages one-at-a-time to said transfer position in synchronism with the presentation of the corresponding odd and even original pages.

9. A convenience copier for producing multiple copies of an original, the original and the corresponding copies including a plurality of sheets of support material defining first and second faces, respectively, on opposite sides of the support material sheets, said copier comprising:

a process section including means for establishing image-wise distributions of marking particles representing the faces of the original sheets, said process section defining an exposure position at which original sheets are located for copying one-face-at-a-time and a transfer position at which copy sheets are located for receiving the image-wise distributions one-distribution-at-a-time;

an original-sheet feeder for presenting the original sheets to said exposure position of said process section for copying, said original-sheet feeder including storage means for receiving and supporting the original sheets spaced from said exposure position, and means for circulating and recirculating the original sheets, one-after-another, from said storage means to said exposure position and back to said storage means, said circulating and recirculating means including means for presenting the first and second faces of each original sheet to the exposure position for copying during each circulating of that sheet and for presenting a different original-sheet face to the exposure position for each establishment of an image-wise distribution of marking particles; and a copy-sheet feeder for presenting the copy sheets to said transfer position of said process section to receive the image-wise distributions of marking particles, said copy-sheet feeder including means for presenting the first and second faces of the copy sheets one-face-at-a-time to said transfer position in synchronism with the presentation of corresponding first and second faces of the original sheets to said exposure position.

10. A copier for producing multiple copies of an original, the copies and the original including sheets of support material having first and second faces, said copier comprising:

a processing section including an exposure station and means for establishing a representation of the original;

means for presenting each sheet of the original to said exposure station of said processing section a plurality of times in succession, one presentation of an original sheet for each establishment of an original representation, said original presenting means including a storage facility for holding the original sheets and a sheet feeding mechanism defining a path for feeding the sheets from said storage facility to said exposure station and back to said storage facility, said sheet feeding mechanism including means for inverting each original sheet between its successive presentations to present both of the first and second original faces for copying; and means for presenting the copy sheets to said processing section, said copy-sheet presenting means including means for presenting and inverting the copy sheets in one-to-one correspondence with the presenting and inverting of the original sheets to present both of the first and second copy faces for receiving the representations of the original.

11. A convenience copier for producing collated copies of a document, the copies and the document including a plurality of sheets having first and second faces, said copier comprising:

a processing section including an exposure station and means for establishing representations of the document sheets;

means for presenting the document sheets to said exposure station of said processing section, said presenting means including a storage facility for holding the document sheets, means for circulating said document sheets successively a plurality of times from said storage facility to said exposure station and back to said storage facility, and means for inverting each document sheet to present both of its first and second faces for copying once for each circulation thereof; and means for presenting the copy sheets to said processing section, said copy-sheet presenting means including means for presenting and inverting the copy sheets in one-to-one correspondence with the presenting and inverting of the document sheets to present both of the first and second copy faces for receiving the representations.

12. A convenience copier for producing multiple copies of an original, the original and the copies including sheets having first and second faces, said copier comprising:

a processing section including an exposure station and means for establishing representations of the first and second faces of the original sheets, one representation after another;

means for circulating said original sheets successively a plurality of times to said exposure station of said processing section for presenting the first and second faces of the circulating sheets to said exposure station, said circulating means inverting each sheet an odd number of times between each of its presentations;

means for twice feeding the copy sheets to said processing section, once to receive a representation on the first face and once again to receive a representation on the second face; and means controlling said process section and said circulating means for presenting an original face to said exposure station once for each establishment of a representation, and controlling said processing section and said feeding means for presenting a copy face to said process section once for each establishment of a representation.

13. A convenience copier for producing multiple copies of an original, the original and the copies including sheets having first and second faces, said copier comprising:

a processing section including an exposure station and means for establishing representations of the first and second faces of the original sheets;

means for presenting the original sheets a plurality of times to said exposure station of said processing section, and for inverting each original sheet an odd number of times between each of its presentations, alternately to present the first and second faces of the original sheets to said exposure station for copying;

means for twice presenting the copy sheets to the processing section, and for inverting the copy sheets an odd number of times between presentations, alternately to present the first and second faces of the copy sheets to the processing section for receiving the representations of the first and second faces of the original sheets; and means for coordinating the presentation and inversion of the original sheets with the presentation and inversion of the copy sheets to produce duplex collated copies.

14. A copier for producing collated duplex copies of a duplex original, the original and the copies including individual sheets having first and second faces, said copier comprising:

a processing section including an exposure station and means for establishing representations of the first and second faces of the original sheets, one representation after another;

means for presenting the original sheets and copy sheets to said processing section a plurality of times, and for inverting each individual sheet, original and copy, between each of its presentations, to present the first and second faces of the original sheets to said exposure station for establishing representations thereof and to present the first and second faces of the copy sheets to said processing section for receiving such representations; and means controlling said presenting means and said processing section for presenting a different original face for each successive establishment of a representation.

15. A reproduction device for producing multiple copies of a document, the document and the corresponding copies thereof including a plurality of pages defined on first and second opposed faces of flat supports, said device comprising:

a processing section including means for establishing representations of the document pages, said processing section having an exposure platen at which the document support material is located for copying one page at a time, and a transfer station at which the representations of the document pages are applied to the copy support material to produce the copy pages;

a document feeder for presenting the document to said exposure platen of said processing section for copying, said document feeder including storage means for receiving and supporting the document spaced from said exposure platen, and means for circulating and recirculating the document from said storage means to said exposure platen and back to said storage means, said circulating and recirculating means including means for locating the document pages one-at-a-time on said exposure platen for copying every page once and only once during each circulation of the document; and a copy feeder for presenting the copy supports to said transfer station of said processing section to receive the representations, said copy feeder including means for twice presenting each copy support to said transfer station to receive the representations in synchronism with the presentation of the corresponding original pages to said exposure platen.

16. A convenience copier for producing multiple copies of an original, the original including sheets of support material bearing information on first and second faces thereof, the copies including sheets of support material having first and second faces for receiving information thereon, said copier comprising:

a process section including means for establishing representations of the information from the original sheets, said processing section having an exposure station from which the original sheets are copied one face after another, and a transfer station at which the copy sheets receive the representations of the original sheets;

an original sheet feeder for presenting the original sheets to said exposure station of said process section for copying, said original-sheet feeder including a hopper for receiving and supporting the original sheets in a stack spaced from said exposure station, and means for circulating and recirculating the original sheets, one-after-another, from said hopper to said exposure station and back to said hopper, said circulating and recirculating means including means for presenting seriatim the first and second faces of each original sheet to the exposure station for copying such faces once and only once during each circulation of that sheet; and a copy-sheet feeder for presenting the copy sheets to said transfer station of said processing section to receive the representations of the original sheets, said copy-sheet feeder including means for presenting seriatim the first and second faces of the copy sheets to said transfer station.

17. A convenience copier for producing a plurality of copies from a multi-page original, the original including a plurality of original supports defining odd and even original pages on opposite faces of the original supports, and each copy including a plurality of copy supports defining odd and even copy pages corresponding to the original pages, said copier comprising:

a processing section including means for establishing representations of copied original pages, said processing section having an exposure position at which original pages are located for copying one-at-a-time and a transfer position at which copy pages are located for receiving the original page representations one-at-a-time;

an original feeder for presenting the original supports to said exposure position of said processing section for copying, said original feeder including storage means for receiving and supporting the original supports spaced from said exposure position, and means for circulating and recirculating the original supports, one-after-another, from said storage means to said exposure position and back to said storage means, said circulating and recirculating means including means for presenting the odd and even original pages of each original support to the exposure position for copying once and only once during each circulation of that original support; and a copy feeder for presenting the copy supports to said transfer position of said processing section to receive the original page representation, said copy feeder including means for presenting the odd and even copy pages one-at-a-time to said transfer position in synchronism with the presentation of the corresponding odd and even original pages.

18. A convenience copier for producing multiple copies of an original, the original and the corresponding copies including a plurality of sheets of support material defining first and second faces, respectively, on opposite sides of the support material sheets, said copier comprising:

a process section including means for establishing representations of the faces of the original sheets, said process section defining an exposure position at which original sheets are located for copying one-face-at-a-time and a transfer position at which copy sheets are located for receiving the representations one-representation-at-a-time;

an original-sheet feeder for presenting the original sheets to said exposure position of said process section for copying, said original-sheet feeder including storage means for receiving and supporting the original sheets spaced from said exposure position, and means for circulating and recirculating the original sheets, one-after-another, from said storage means to said exposure position and back to said storage means, said circulating and recirculating means including means for presenting the first and second faces of each original sheet to the exposure position for copying during each circulating of that sheet and for presenting a different original-sheet face to the exposure position for each establishment of a representation of the original sheet face; and a copy-sheet feeder for presenting the copy sheets to said transfer position of said process section to receive the original sheet representations, said copy-sheet feeder including means for presenting the first and second faces of the copy sheets one-face-at-a-time to said transfer position in synchronism with the presentation of corresponding first and second faces of the original sheets to said exposure position.

19. Sheet feeder apparatus for presenting original sheets having first and second faces to an exposure position for copying, said apparatus comprising:

a hopper for receiving and supporting the original sheets; and means for circulating and recirculating the original sheets, one-after-another, from said hopper to said exposure position and back to said hopper, said circulating and recirculating means including means for presenting seriatim the first and second faces of each original sheet to the exposure position for copying.

20. Recirculating feeder apparatus for use with a copier to produce multiple copies of an original, the original including sheets of support material having first and second faces, said apparatus comprising:

(a) an exposure position;

(b) a storage facility for holding the original sheets; and (c) means for circulating said original sheets successively a plurality of times from said storage facility to said exposure position and back to said storage facility for presenting the first and second faces of the original sheets to said exposure position, said circulating means inverting each individual sheet an odd number of times between each of its presentations.

21. Recirculating feeder apparatus for use with a copier to produce multiple copies of an original, the original including sheets of support material having first and second faces, said apparatus comprising:

(a) an exposure station;

(b) a storage facility for holding the original sheets; and (c) a sheet feeding mechanism for presenting each sheet of the original to said exposure station a plurality of times in succession, said sheet feeding mechanism defining a path for circulating each sheet of the original from said storage facility to said exposure station and back to said storage facility, said sheet feeding mechanism including means for inverting each original sheet to present both of the first and second original faces to said exposure station during circulation of a sheet.

22. Recirculating sheet feeding apparatus for use with a copier to produce collated copies of an original document, the document including a plurality of sheets of support material having sequentially numbered pages on first and second faces of the support material, said apparatus comprising:

a first hopper adapted to receive a stack of document sheets in their normal page sequential order with the first page of the document facing upwardly;

a second hopper spaced from the first hopper;

an exposure station spaced from the hoppers at which documents are adapted to be positioned for exposure and reproduction by the copier;

a first sheet feeding mechanism for removing individual document sheets from the bottom of the stack in the first hopper, inverting the document sheets once, and delivering them to the second hopper whereby each individual document sheet is inverted to change the page sequence but individual document sheets are positioned in the second hopper in the same order as they were in the first hopper;

a second sheet feeding mechanism for presenting each sheet in the second hopper to the exposure station a plurality of times in succession, said second sheet feeding mechanism comprising means (1) for inverting each document sheet once as it travels from the second hopper to the exposure station, thereby to present one face of the document sheet for exposure, (2) for inverting each document sheet and presenting the document sheet to the exposure station a second time so that the second face thereof is presented for exposure, and (3) for returning each document sheet from the exposure station to the second hopper along a sheet path that inverts the document sheet twice between the exposure station and the second hopper; and means for feeding each document sheet in succession from the bottom of the stack in second hopper to the first hopper along a sheet path that results in the document sheets being inverted once, thereby to return the document sheets to the first hopper in their original page sequence order.

* * * * *

REEXAMINATION CERTIFICATE (480th)

United States Patent [19]

Gustafson

[11] B1 4,140,387

[45] Certificate Issued Apr. 8, 1986

[54] APPARATUS FOR PRODUCING COLLATED COPIES FROM TWO SIDED ORIGINALS

[75] Inventor: Gary B. Gustafson, Hilton, N.Y.

[73] Assignee: Eastman Kodak Company, Rochester, N.Y.

Reexamination Request:
No. 90/000,769, Apr. 30, 1985

Reexamination Certificate for:
Patent No.: 4,140,387
Issued: Feb. 20, 1979
Appl. No.: 867,842
Filed: Jan. 9, 1978

Related U.S. Application Data

[63] Continuation of Ser. No. 691,938, Jun. 1, 1976, abandoned.

[51] Int. Cl.[4] ..................... G03B 27/32; G03G 15/00; B65H 5/00; B65H 29/00

[52] U.S. Cl. ................................ 355/14 SH; 271/3.1; 271/65; 355/23

[58] Field of Search ............ 355/3 SH, 14 SH, 23-26, 355/47, 50, 51, 75; 271/3, 3.1, 4, 9, 65, 186

[56] References Cited

U.S. PATENT DOCUMENTS

| | | | |
|---|---|---|---|
| Re. 27,976 | 4/1974 | Sahley | 355/64 |
| 1,939,446 | 12/1933 | Hessert | 355/23 |
| 2,472,931 | 6/1949 | Yohn | 355/23 |
| 3,227,444 | 1/1966 | Egan | 271/65 |
| 3,318,212 | 5/1967 | Rubin | 355/3 R |
| 3,416,791 | 11/1968 | Beckman, Jr. et al. | 271/65 |
| 3,506,347 | 4/1970 | Carlson | 355/3 R |
| 3,536,398 | 10/1970 | Bhagat | 355/3 |
| 3,552,739 | 1/1971 | Roberts et al. | 271/4 |
| 3,556,511 | 1/1971 | Howard et al. | 271/4 |
| 3,556,512 | 1/1971 | Fackler et al. | 271/4 |
| 3,615,129 | 10/1971 | Drawe et al. | 355/3 |
| 3,623,806 | 11/1971 | Short | 355/14 |
| 3,630,607 | 12/1971 | Korn et al. | 355/6 |
| 3,645,615 | 2/1972 | Spear | 355/3 |
| 3,671,118 | 6/1972 | Fantuzzo et al. | 355/3 R |
| 3,672,765 | 6/1972 | Altmann | 355/24 |
| 3,675,999 | 7/1972 | Komori et al. | 355/8 |
| 3,687,541 | 8/1972 | Aser et al. | 355/14 |
| 3,700,231 | 10/1972 | Aasen et al. | 271/65 X |
| 3,709,595 | 1/1973 | Turner et al. | 355/14 |
| 3,775,102 | 11/1973 | Punnett | 96/1 R |
| 3,841,754 | 10/1974 | Drexler et al. | 355/17 |
| 3,844,653 | 10/1974 | Kelly | 355/8 |
| 3,844,654 | 10/1974 | Guenther | 355/24 |
| 3,851,872 | 12/1974 | Gerbasi | 271/173 |
| 3,856,295 | 12/1974 | Looney | 271/65 |
| 3,862,802 | 1/1975 | Till | 355/23 |
| 3,866,904 | 2/1975 | Stemmle | 271/173 |
| 3,869,202 | 3/1975 | Tabata et al. | 355/3 R |
| 3,888,579 | 6/1975 | Rodek et al. | 271/4 X |
| 3,963,345 | 6/1976 | Stemmle et al. | 355/50 |
| 3,980,406 | 9/1976 | Lang | 355/24 |
| 4,035,073 | 7/1977 | Del Vecchio | 355/24 |
| 4,066,252 | 1/1978 | Wick | 271/3 |
| 4,089,515 | 5/1978 | Stange et al. | 271/3 |
| 4,109,903 | 8/1978 | Stange et al. | 271/3 |
| 4,169,674 | 10/1979 | Russel | 355/14 SH |

FOREIGN PATENT DOCUMENTS

| | | |
|---|---|---|
| 130740 | 12/1974 | Japan . |
| 19194 | 8/1968 | Japan . |

*Primary Examiner*—Fred L. Braun

[57] ABSTRACT

A convenience copier is provided with the capability for producing duplex, collated copies in page-sequential order, or an approximation thereof. The copier includes a processing section for establishing visible representations of the original, feeding sections for presenting the original sheets and copy sheets to the processing section on a one-original-sheet one-copy-sheet basis, and inverting means for presenting both faces of the original sheets to the processing section for copying and both faces of the copy sheets to the processing section for receiving the visible representations. The original sheets are circulated to the processing section in a manner suitable for producing collated copies and inverted with each circulation in a manner suitable for producing the copies in page sequential order.

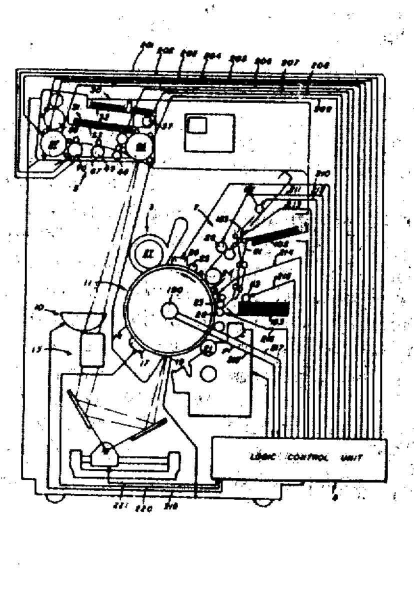

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 22 is confirmed.

Claims 1, 3–6, 8–15 and 18 are cancelled.

Claims 2, 7, 16, 17 and 19–21 are determined to be patentable as amended.

New claims 23 and 24 are added and determined to be patentable.

2. A convenience copier for producing collated copies of a document, the copies and the document including a plurality of sheets having first and second faces, said copier comprising:

a processing section including an exposure station and means for establishing visible representations of the document sheets;

means for presenting the document sheets to said exposure station of said processing section, said presenting means including a storage facility for holding the document sheets, means for circulating said document sheets successively a plurality of times from said storage facility to said exposure station and back to said storage facility, and means for inverting each document sheet to present both of its first and second faces for copying once for each circulation thereof, *without returning said sheet to the storage facility until both faces have been presented for copying*; and means for presenting the copy sheets to said processing section, said copy-sheet presenting means including means for presenting and inverting the copy sheets in one-to-one correspondence with the presenting and inverting of the document sheets to present both of the first and second copy faces for receiving the visible representations.

7. A convenience copier for producing multiple copies of an original, the original including sheets of support material bearing information on first and second faces thereof, the copies including sheets of support material having first and second faces for receiving information thereof, said copier comprising:

a process section including means for establishing distributions of marking particles representing information from the original sheets, said processing section having an exposure station from which the original sheets are copied one face after another, and a transfer section at which the copy sheets receive the distributions of marking particles from the process section;

an original sheet feeder for presenting the original sheets to said exposure station of said process section for copying, said original-sheet feeder including a hopper for receiving and supporting the original sheets in a stack spaced from said exposure station, and means for circulating and recirculating the original sheets, one-after-another, from said hopper to said exposure station and back to said hopper, said circulating and recirculating means including means for presenting seriatim the first and second faces of each original sheet to the exposure station for copying such faces once and only once during each circulation of that sheet, *without returning said original sheet to the hopper between presentations of the first and second faces during a single circulation*; and a copy-sheet feeder for presenting the copy sheets to said transfer station of said processing section to receive the distributions of marking particles, said copy-sheet feeder including means for presenting seriatim the first and second faces of the copy sheets to said transfer station.

16. A convenience copier for producing multiple copies of an original, the original including sheets of support material bearing information on first and second faces thereof, the copies including sheets of support material having first and second faces for receiving information thereon, said copier comprising:

a process section including means for establishing representation of the information from the original sheets, said processing section having an exposure station from which the original sheets are copied one face after another, and a transfer station at which the copy sheets receive the representations of the original sheets;

an original sheet feeder for presenting the original sheets to said exposure station of said process section for copying, said original-sheet feeder including a hopper for receiving and supporting the original sheets in a stack spaced from said exposure station, and means for circulating and recirculating the original sheets, one-after-another, from said hopper to said exposure station and back to said hopper, said circulating and recirculating means including means for presenting seriatim the first and second faces of each original sheet to the exposure station for copying such faces once and only once during each circulation of that sheet, *without returning the sheet to the stack between the presentations of the first and second faces in each circulation*; and a copy-sheet feeder for presenting the copy sheets to said transfer station of said processing section to receive the representations of the original sheets, said copy-sheet feeder including means for presenting seriatim the first and second faces of the copy sheets to said transfer station.

17. A convenience copier for producing a plurality of copies from a multi-page original, the original including a plurality of original supports defining odd and even original pages on opposite faces of the original supports, and each copy including a plurality of copy supports defining odd and even pages corresponding to the original pages, said copier comprising:

a processing section including means for establishing representations of copied original pages, said processing section having an exposure position at which original pages are located for copying one-at-a-time and a transfer position at which copy pages are located for receiving the original page representations one-at-a-time;

an original feeder for presenting the original supports to said exposure position of said processing section for copying, said original feeder including storage means for receiving and supporting the original supports spaced from said exposure position, and means for circulating and recirculating the original supports, one-after-another, from said storage means to said exposure position and back to said storage means, said circulating and recirculating means including means for presenting the odd and even original pages of each original support to the exposure position for copying once and only once during each circulation of that original support, *without returning the support to the storage means during a circulation until both odd and even pages of that support have been presented for copying*; and a copy feeder for presenting the copy supports to said transfer position of said processing section to receive the original page representation, said copy feeder including means for presenting the odd and even copy pages one-at-a-time to said transfer position in synchronism with the presentation of the corresponding odd and even original pages.

19. Sheet feeder apparatus for presenting original sheets having first and second faces to an exposure position for copying, said apparatus comprising:

a hopper for receiving and supporting the original sheets; and means for circulating and recirculating the original sheets, one-after-another, from said hopper to said exposure position and back to said hopper, said circulating and recirculating means including means for presenting seriatim the first and second faces of each original sheet to the exposure position for copying, *without returning the sheet to the hopper until both faces have been presented in each circulation.*

20. Recirculating feeder apparatus for use with a copier to produce multiple copies of an original, the original including sheets of support material having first and second faces, said apparatus comprising:

(a) an exposure position;

(b) a storage facility for holding the original sheets; and (c) means for circulating said original sheets successively a plurality of times from said storage facility to said exposure position and back to said storage facility for presenting the first and second faces of the original sheets to said exposure position, *without returning the original sheets to the storage facility until both faces have been presented in each circulation,* said circulating means inverting each individual sheet an odd number of times between each of its presentations.

21. Recirculating feeder apparatus for use with a copier to produce multiple copies of an original, the original including sheets of support material having first and second faces, said apparatus comprising:

(a) an exposure station;

(b) a storage facility for holding the original sheets; and (c) a sheet feeding mechanism for presenting each sheet of the original to said exposure station a plurality of times in succession, said sheet feeding mechanism defining a path for circulating each sheet of the original from said storage facility to said exposure station and back to said storage facility, said sheet feeding mechanism including means for inverting each original sheet to present both of the first and second original faces to said exposure station *without returning the original sheet to the storage facility until both faces have been presented* during circulation of a sheet.

*23. Recirculating sheet feeder apparatus for presenting original sheets having first and second faces to an exposure position for copying, said apparatus comprising:*

*a hopper for receiving and supporting the original sheets in a stack,*

*means for circulating and recirculating the original sheets, one after another, from said hopper to said exposure position and back to said hopper, said circulating and recirculating means including*

*(a) means for inverting each original sheet once during a portion of said circulation between the hopper and the exposure position to present the first face for copying;*

*(b) means for inverting each original sheet once during a portion of said circulation between presentation of the first face and presentation of the second face for copying without returning said sheet to the hopper; and*

*(c) means for returning each original sheet to the hopper in its original orientation after presentation of the second face for copying.*

*24. Apparatus according to claim 23 for use with original sheets arranged in a stack in page sequential order with page one on top, wherein said apparatus includes means for inverting each sheet and stacking said sheets in said hopper in order with page two on top.*

* * * * *

SR

XR 4,140,387

REEXAMINATION CERTIFICATE (979th)

United States Patent [19]

Gustafson

[11] B2 4,140,387

[45] Certificate Issued Jan. 3, 1989

[54] APPARATUS FOR PRODUCING COLLATED COPIES FROM TWO SIDED ORIGINALS

[75] Inventor: Gary B. Gustafson, Hilton, N.Y.

[73] Assignee: Eastman Kodak Company, Rochester, N.Y.

Reexamination Request:
No. 90/001,490, Apr. 8, 1988

Reexamination Certificate for:
Patent No.: 4,140,387
Issued: Feb. 20, 1979
Appl. No.: 867,842
Filed: Jan. 9, 1978

Reexamination Certificate B1 4,140,387 issued Apr. 8, 1986.

Related U.S. Application Data

[63] Continuation of Ser. No. 691,938, Jun. 1, 1976, abandoned.

[51] Int. Cl.[4] .................... G03B 27/32; G03G 15/00; B65H 5/00; B65H 29/00

[52] U.S. Cl. .............................. 355/14 SH; 271/3.1; 271/65; 355/23

[58] Field of Search ................ 355/3 SH, 14 SH, 23, 355/24, 25, 26, 47, 50, 51, 75; 271/3, 3.1, 4, 9, 65, 186

[56] References Cited

U.S. PATENT DOCUMENTS

| | | | |
|---|---|---|---|
| Re. 27,976 | 4/1974 | Sahley | 355/64 |
| 1,939,446 | 12/1933 | Hessert | 355/23 |
| 2,472,931 | 6/1949 | Yohn | 355/23 |
| 3,227,444 | 1/1966 | Egan | 271/65 |
| 3,318,212 | 5/1967 | Rubin | 355/3 R |
| 3,416,791 | 11/1968 | Beckman, Jr. et al. | 271/65 |
| 3,506,347 | 4/1970 | Carlson | 355/3 R |
| 3,536,398 | 10/1970 | Bhagat | 355/3 |
| 3,552,739 | 1/1971 | Roberts et al. | 271/4 |
| 3,556,511 | 1/1971 | Howard et al. | 271/4 |
| 3,556,512 | 1/1971 | Fackler et al. | 271/4 |
| 3,615,129 | 10/1971 | Drawe et al. | 355/3 |
| 3,623,806 | 11/1971 | Short | 355/14 |
| 3,630,607 | 12/1971 | Korn et al. | 355/6 |
| 3,645,615 | 2/1972 | Spear | 355/3 |
| 3,671,118 | 6/1972 | Fantuzzo et al. | 355/3 R |
| 3,672,765 | 6/1972 | Altmann | 355/24 |
| 3,675,999 | 7/1972 | Komori et al. | 355/8 |
| 3,687,541 | 8/1972 | Aser et al. | 355/14 |
| 3,700,231 | 10/1972 | Aasen et al. | 271/65 X |
| 3,709,595 | 1/1973 | Turner et al. | 355/14 |
| 3,775,102 | 11/1973 | Punnett | 96/1 R |
| 3,841,754 | 10/1974 | Drexler et al. | 355/17 |
| 3,844,653 | 10/1974 | Kelly | 355/8 |
| 3,844,654 | 10/1974 | Guenther | 355/24 |
| 3,851,872 | 12/1974 | Gerbasi | 271/173 |
| 3,856,295 | 12/1974 | Looney | 271/65 |
| 3,862,802 | 1/1975 | Till | 355/23 |
| 3,866,904 | 2/1975 | Stemmle | 271/173 |
| 3,869,202 | 3/1975 | Tabata et al. | 355/3 R |
| 3,888,579 | 6/1975 | Rodek et al. | 271/4 X |
| 3,963,345 | 6/1976 | Stemmle et al. | 355/50 |
| 3,980,406 | 9/1976 | Lang | 355/24 |
| 4,035,073 | 7/1977 | Del Vecchio | 355/24 |
| 4,066,252 | 1/1978 | Wick | 271/3 |
| 4,089,515 | 5/1978 | Stange et al. | 271/3 |
| 4,109,903 | 8/1978 | Stange et al. | 271/3 |
| 4,169,674 | 10/1979 | Russel | 355/14 SH |

FOREIGN PATENT DOCUMENTS

| | | |
|---|---|---|
| 19194 | 8/1968 | Japan . |
| 130740 | 12/1974 | Japan . |

OTHER PUBLICATIONS

IBM Technical Disclosure Bulletin, vol. 14, No. 5, Oct. 1971, p. 1547.

*Primary Examiner*—Fred L. Braun

[57] ABSTRACT

A convenience copier is provided with the capability for producing duplex, collated copies in page-sequential order, or an approximation thereof. The copier includes a processing section for establishing visible representations of the original, feeding sections for presenting the original sheets and copy sheets to the processing section on a one-original-sheet one-copy-sheet basis, and inverting means for presenting both faces of the original sheets to the processing section for copying and both faces of the copy sheets to the processing section for receiving the visible representations. The original sheets are circulated to the processing section in a manner suitable for producing collated copies and inverted with each circulation in a manner suitable for producing the copies in page sequential order.

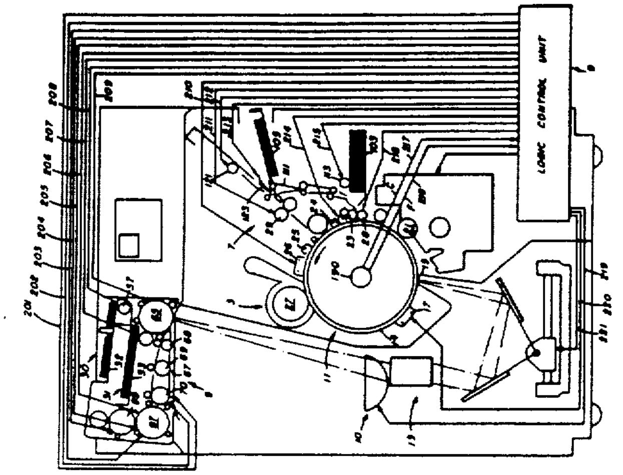

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 2, 7, 16, 17 and 19–24 is confirmed.

Claims 1, 3–6, 8–15 and 18 were previously cancelled.

* * * * *